United States Patent [19]

Atwell

[11] 3,995,910
[45] Dec. 7, 1976

[54] CIGARETTE FILTER ROD TRANSFER APPARATUS HAVING ROD KINETIC ENERGY ABSORBER

[75] Inventor: Charles Gary Atwell, Mechanicsville, Va.

[73] Assignee: Philip Morris Incorporated, New York, N.Y.

[22] Filed: Mar. 26, 1975

[21] Appl. No.: 562,169

[52] U.S. Cl. .............................. 302/2 R; 267/140; 302/59
[51] Int. Cl.² ........................................ B65G 51/02
[58] Field of Search ............... 302/2 R, 42, 49, 59; 131/25; 214/302; 198/20 C, 45; 267/139–141, 136, 153; 104/249, 250, 254; 243/19, 24, 38

[56] References Cited
UNITED STATES PATENTS

| 1,218,910 | 3/1917 | Taisey | 243/24 |
|---|---|---|---|
| 1,301,427 | 4/1919 | Girtanner | 302/25 |
| 3,189,297 | 6/1965 | Ellithorpe | 243/19 |
| 3,282,399 | 11/1966 | Morton | 198/35 |
| 3,397,922 | 8/1968 | Dearsley | 302/2 R |
| 3,784,182 | 1/1974 | Sobel | 267/140 |

FOREIGN PATENTS OR APPLICATIONS

| 1,091,481 | 10/1960 | Germany | 198/45 |
|---|---|---|---|
| 1,054,906 | 4/1959 | Germany | 198/45 |

Primary Examiner—Evon C. Blunk
Assistant Examiner—Jeffrey V. Nase
Attorney, Agent, or Firm—Watson Leavenworth Kelton & Taggart

[57] ABSTRACT

A pneumatic conduit cigarette rod transfer system includes an energy absorbing assembly adapted to dissipate the kinetic energy of rods traversing a guide on issuance from the conduit to avert end shape alteration of transferred rods.

16 Claims, 6 Drawing Figures

CIGARETTE FILTER ROD TRANSFER APPARATUS HAVING ROD KINETIC ENERGY ABSORBER

FIELD OF THE INVENTION

This invention relates generally to article handling and more particularly to apparatus and systems for transporting filter rods from a remote location to filter cigarette-making machinery.

BACKGROUND OF THE INVENTION

As contrasted with the automated making of non-filter cigarettes, filter cigarette manufacture presents a more demanding operation in its continuing requirement for supply of filter rods to the ultimate cigarette maker or assembler. Typically, the supplied rods are elongate solid cylinders of fibrous material cuttable longitudinally to form a plurality of filter plugs, each for use in the making of an individual cigarette. Whereas hand or manual feeding of rods to the maker directly at the making location has long been practiced, for example, by placing trays of rods atop a rod hopper on the maker, more recent efforts have sought to feed rods to the rod hopper in automated manner from a location remote from the maker, apparatus for use in such systems being disclosed in U.S. Pat. Nos. 3,608,972 and 3,222,110 and British Pat. No. 1,070,339 and entire systems being commercially known, for example, the machinery identified as "APHIS (Automated Plug Handling Inspection System) II", produced by the Molins Machine Co., Ltd. and described in its publication for such machinery entitled "Illustrated Parts List". A modified version of this last-mentioned system is set forth in copending commonly-assigned U.S. Application Ser. No. 527,907 of applicant and others, filed on Nov. 27, 1974.

The APHIS II system and that of said copending application both incorporate at the maker location a guide for receiving rods from an air-pressurized conduit and delivering them singly to a vertical channel from which they are dispensed to rod conveyor means leading to a rod hopper.

SUMMARY OF THE INVENTION

The present invention has as an object the provision of a system and apparatus for minimizing damage to cigarette rods susceptible to damage in the course of transport thereof from a remote location to a maker location through air pressurized conduits.

In attaining such object, the invention introduces at the maker location of systems of such type as the APHIS II system and that of the aforesaid copending application a rod guide arrangement inclusive of an energy absorbing assembly adapted to dissipate the kinetic energy of rods traversing the guide without damage thereto such that the rods are delivered to the abovementioned vertical channel without end shape alteration. The energy absorbing assembly, giving rise to a system diverse from such presently known systems, includes a flexible plastic sheet member disposed outwardly of and in facing relation to an open end of such rod guide, thus defining an impact surface for rods traversing the guide, and a block of resilient material disposed outwardly of the sheet member.

The foregoing and other objects and features of the invention will be evident from the following detailed description of the preferred system and apparatus embodiment thereof and from the drawings wherein like reference numerals identify like parts throughout.

DESCRIPTION OF THE PREFERRED EMBODIMENT

Figure 1:
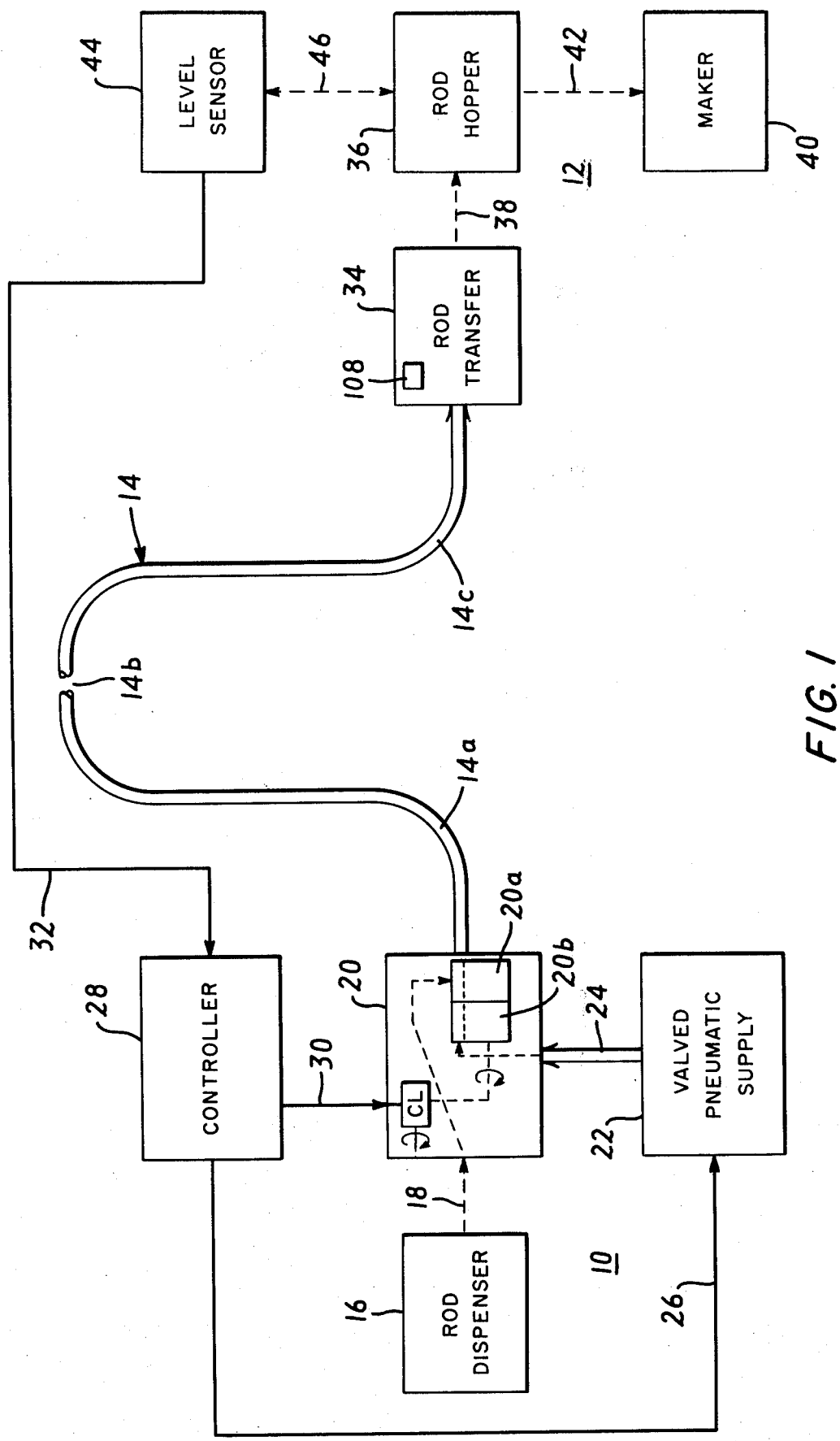
FIG. 1 is a functional block diagram of a system according with the invention.

Referring to FIG. 1, the system therein illustrated for automated pneumatic transfer and handling of cigarette rods is of the type disclosed in the aforesaid copending application and comprises a transmitter 10 and a receiver 12 remotely located relative to one another. Typically, the transmitter is situated at a rod storage or like location which may be several hundreds of feet away from the receiver, the latter being at the site at which rods are cut into individual plugs which are then integrated with paper and tobacco for the making of filter cigarettes. Conduit 14, desirably in the form of cylindrical tubing of diameter slightly larger than the cigarette rod diameter, extends from the transmitter to the receiver and includes an upwardly extending section 14a, an extended length substantially horizontal section 14b and a downwardly extending section 14c. With this configuration for conduit 14, sections 14a and 14c may extend rapidly upwardly over relatively short horizontal distances to section 14b, which may be ceiling-mounted whereby use of the conduit may be enjoyed without disturbing normal floor operations in the facility.

In the interests of brevity, extended incorporating reference is made to the previously known automated cigarette rod handling system identified above as "APHIS II" and to the complete pictorial disclosure of the components thereof set forth in the above-referenced Molins publication.

Transmitter 10 includes a rod dispenser 16, such as is in the APHIS II system, adapted to sequentially supply at its outlet 18 individual rods for use in rod distributor 20. While not shown in detail in the accompanying drawings, dispenser 16 thus may comprise a hopper having an agitator situated therein and continuously energized to distribute rods to a vertical channel having an inlet of width slightly larger than the diameter of the rods and length slightly larger than the rod length, whereby the rods are transported downwardly essentially horizontally to outlet 18. Distributor 20, also as found in the aforesaid APHIS II system, includes a unitary assembly adapted for rotation about a horizontal axis and having a first elongate cylindrical member 20a defining longitudinally extending open peripheral slots of semicircular cross-section and movable successively into registration with and below the outlet of the vertical channel. Juxtaposed axially with such cylindrical member for corotation therewith is a second elongate assembly 20b of discrete peripheral cylindrical members defining cylindrical passages therethrough aligned with the first cylindrical member slots. Clutch CL provides selective rotational input to members 20a and 20b as discussed below.

Distributor 20 is served with pressurized air by valved pneumatic supply 22 over line 24. Such pressurized air is applied sequentially to the second cylindrical member passages in the course of rotation thereof to direct rods supported in the first cylindrical member peripheral slots seriatim into conduit section 14a.

Transmitter section 10 includes a controller 28 for purposes of such selective energization of line 26 and also for energization of line 30 which provides selective energization of clutch CL to rotate the aforesaid unitary assembly of distributor 20. Controller 28 is itself responsive, in energizing lines 26 and 30, to the state, e.g., grounded or open-circuited, of line 32 derived from receiver 12.

Turning now to receiver 12, rod transfer unit 34, to which the present invention is particularly directed as below discussed, receives rods seriatim from conduit section 14c and transfers the same individually to its outlet 38 and then into rod hopper 36. One form of transfer unit 34 is embodied in the aforesaid APHIS II system and includes apparatus for receiving rods and individually transferring them onto the surface of a horizontally disposed toothed chain belt conveyor which exits into hopper 36. Hopper 36 in turn supplies the rods to cigarette maker 40 through outlet 42.

Level sensor 44 is associated with hopper 36 as indicated by line 46 therebetween to sense the level of rods in the hopper and to change the state of line 32 when a preselected low rod level condition exists in the hopper.

Figure 2:
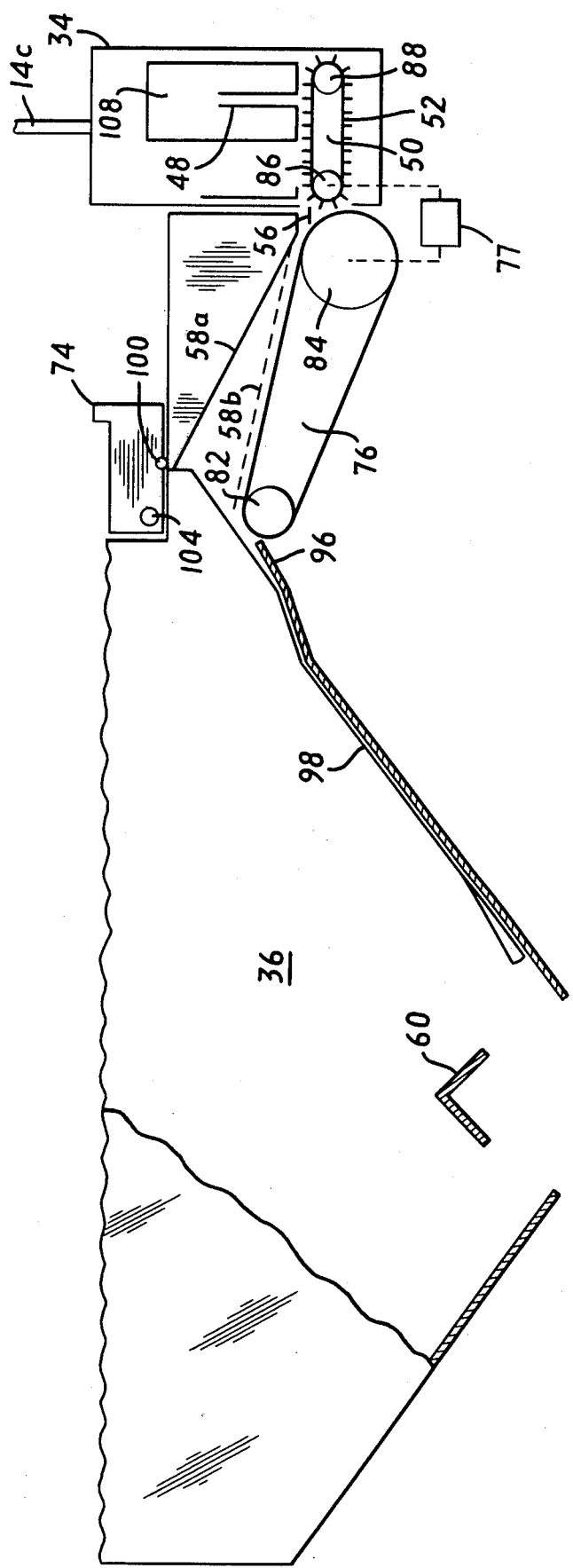
FIG. 2 is a front elevational view of a maker rod hopper with schematic indication of associated rod transfer apparatus according with the invention.

Turning now to FIG. 2, vertical channel 48 of transfer unit 34 issues rods individually onto horizontally disposed chain belt conveyor 50 whereby rods are positively issued at outlet 54 by engagement with belt teeth 52. Plate 56 supports movement of rods issuing at outlet 54 into hopper 36.

Hopper 36 includes opposed downwardly sloping sidewalls which lead to apparatus of maker 40 adapted for cutting rods into filter plugs. The hopper may be of the type commonly used in manually-fed machinery, such as of the well-known PA-8 variety having an agitator 60 rotatively reciprocated to circulate rods downwardly into the maker. Hopper 36 may be of type having greater rod capacity than the PA-8 variety, such as is discussed in the aforementioned copending application, in which case means are included for forcibly moving cigarette rods from conveyor 50 to a further issue position interiorly of the hopper. Thus, the FIG. 2 apparatus includes a timing belt or like conveyor 76 driven through gearing 77 by drive means of conveyor 50. Conveyor 76 includes spaced endless bands extending from plate 56 and encircling rollers 82 and 84. Rollers 82 and 84 are vertically displaced from one another as contrasted with common vertical disposition for rollers 86 and 88 of conveyor 50 such that the belts of conveyor 76 are inclined upwardly from the horizontally disposed belts of conveyor 50. Hopper 36 includes an inclined entry sidewall 58a and supports a flexible strip drag member 58b of nylon or vinyl to facilitate properly oriented transport of first conveyed rods.

The rightward sloping wall of hopper 36 includes a lip portion 96 juxtaposed with roller 82 to receive rods issuing from conveyor 76. Hopper control arm 98 is supported for pivotal movement by shaft 100 and, at start-up of the system, i.e., with hopper 36 empty, arm 98 is in facing relation to conveyor 76. A light source of level sensor 44 directs its output onto detector 104 where rods in the hopper are not at a level to intercept and block light transmission in the sensor. The sensor 44 accordingly applies ground potential to line 32 (FIG. 1) indicative of a rod hopper demand condition to which the system is operatively responsive to supply rods to unit 76 whence they are directed into hopper 36 and elevate control arm 98 as the hopper becomes filled. Supply of rods continues until hopper 36 is filled to an extent displacing control arm 98 upwardly into a position where hopper-contained rods interrupt passage of light between the light source and detector 104. Thereupon, level sensor 44 is operative to open-circuit line 32, whereupon the system discontinues supply of further rods to conveyor 76.

The light source and detector 104 of level sensor 44 are preferably skewed into an alignment which is slightly non-parallel with the disposition of rods contained in the hopper to avoid the possibility of generating a demand signal where the level sensor source and detector communicate with one another through a passage existing between adjacent rods as contrasted with the desired communication therebetween atop the vertically-uppermost contained rods.

Figure 3:
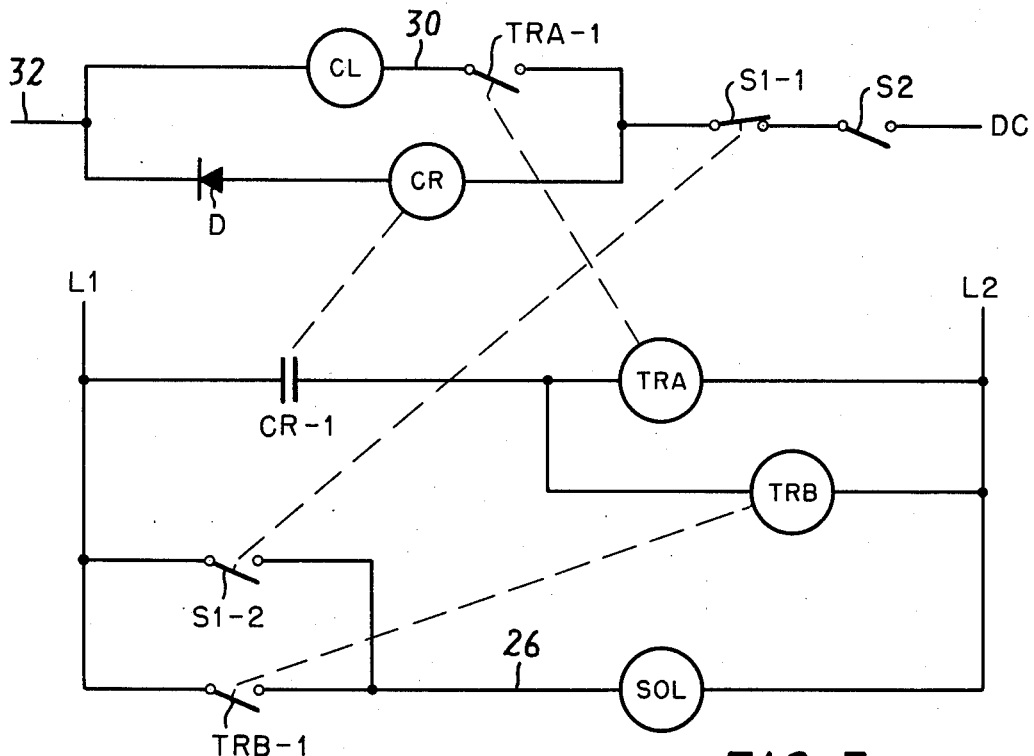
FIG. 3 is a circuit diagram of controller 28 of FIG. 1.

Referring now to FIG. 3, the components of controller 28, the valve member of supply 22 and the clutch of distributor 20 are preferably arranged in a first section connected between line 32 and a suitable DC voltage level and a second section connected across fused power mains L1 and L2. When line 32 is connected to ground potential, as occurs when level sensor 44 senses a rod demand condition in hopper 36, relay CR is energized if switches S1-1 and S2 are closed. With relay CR energized, its contacts CR-1 are closed whereupon time delay relay TRA is connected across L1-L2. Relay TRA is constructed such that a preselected period of time need expire after the relay is connected across L1-L2 before it closes contacts TRA-1 thereof. A preferred relay for this purpose is Potter & Bromfield relay No. CDB-38-70003, having an adjustable time delay of 1 to 10 seconds. Closure of contacts CR-1 also connects time delay relay TRB across L1-L2. This relay closes its contacts TRB-1 immediately upon such connection thereof across lines L1-L2. Accordingly, solenoid SOL of the valve member of supply 22 is connected across lines L1-L2 directly upon energization of relay CR and the pneumatic supply valve supplies pressurized air through distributor 20 to conduit 14.

Following expiration of the time delay of relay TRA, its contacts TRA-1 close, thereby energizing clutch CL of distributor 20. The unitary assembly of distributor 20 is rotated supplying rods successively to conduit 14. The time delay of relay TRA is selected to permit pressurization of conduit 14 sufficient to force rods throughout the entire extent thereof and insures that rods will not be supplied to conduit 14 during initial low pressurization thereof, thus avoiding blockage and like malfunctions in the conduit.

Upon interruption of connection of line 32 to ground potential, i.e., upon satisfaction of a demand for plugs in the receiver, relay CR is deenergized whereupon its contacts CR-1 open, immediately deenergizing relay TRA which opens its contacts TRA-1, thus discontinuing supply of rods to conduit 14 by distributor 20. On the other hand, relay TRB is constructed such that its contacts TRB-1 remain closed for a predetermined time period after energizing voltage is removed from the relay. Pressurization of conduit 14 by supply 22 accordingly continues for a period of time following the discontinuance of rod supply thereto by distributor 20. This maintenance of pressurization in conduit 14 insures that rods delivered thereto prior to satisfaction of the receiver demand and resident in conduit 14 are forced into a quiescent position in conduit section 14b, i.e., a position from which essentially no rods are returned to the transmitter due to conduit pressure differential or gravity.

Relay TRB is preferably Regent relay No. TM2001, having an adjustable time delay of one-tenth to 5 seconds. The valve member of supply 22 is preferably Valcor valve No. 88C89C95-441.

Switch S1-1 is coupled to switch S1-2 and is oppositely-poled therefrom. By this arrangement, solenoid SOL may be energized for conduit clearing purposes while, at the same time, clutch CL is maintained unenergized.

Figure 4:
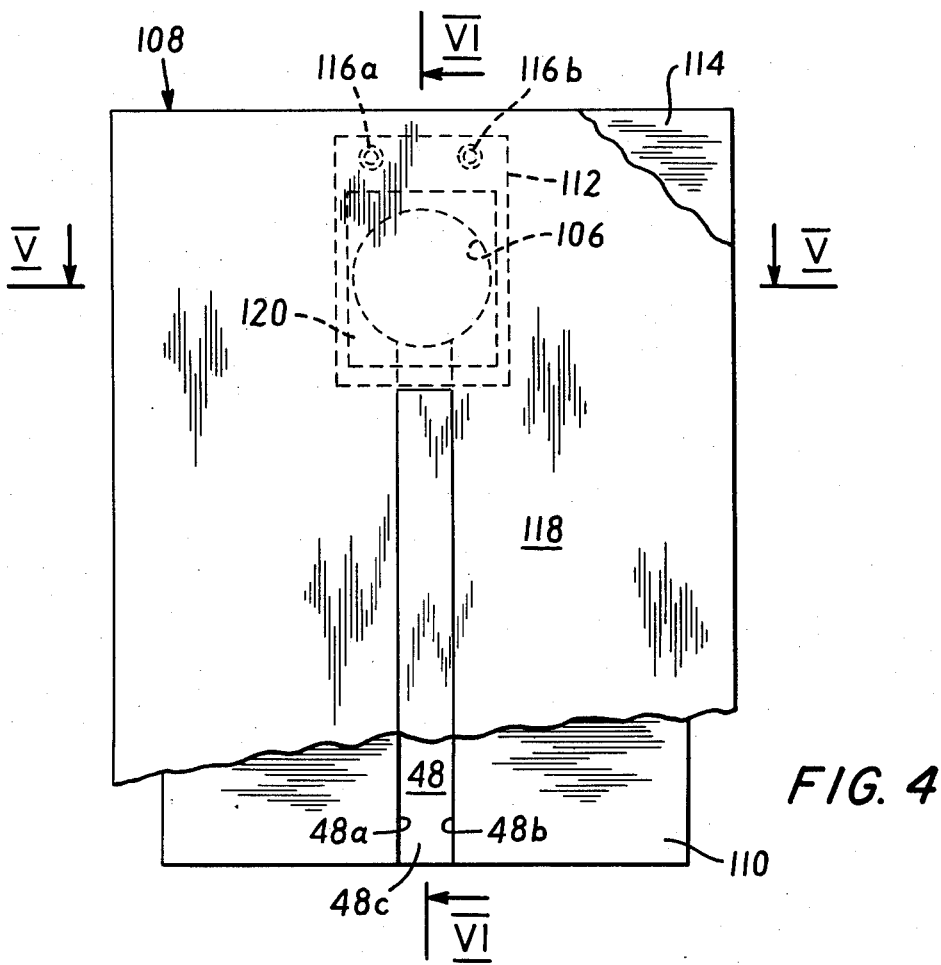
FIG. 4 is a front elevational view of rod stop apparatus according with the invention partly broken away to show detail.
Figure 5:
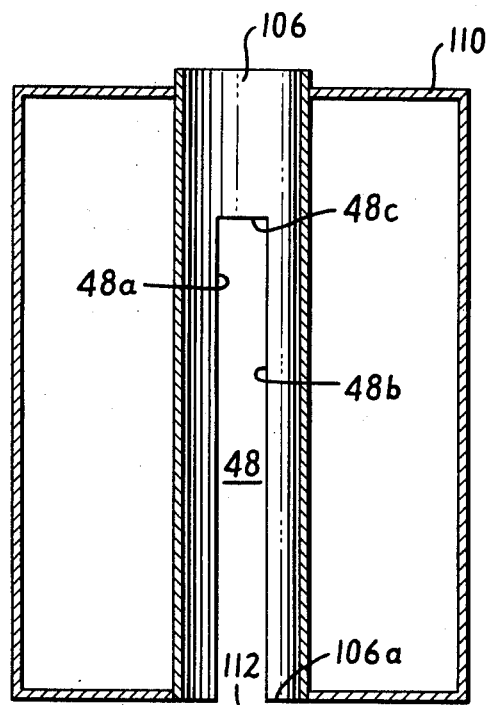
FIG. 5 is a sectional plan view as seen from plane V—V of FIG. 4.
Figure 6:
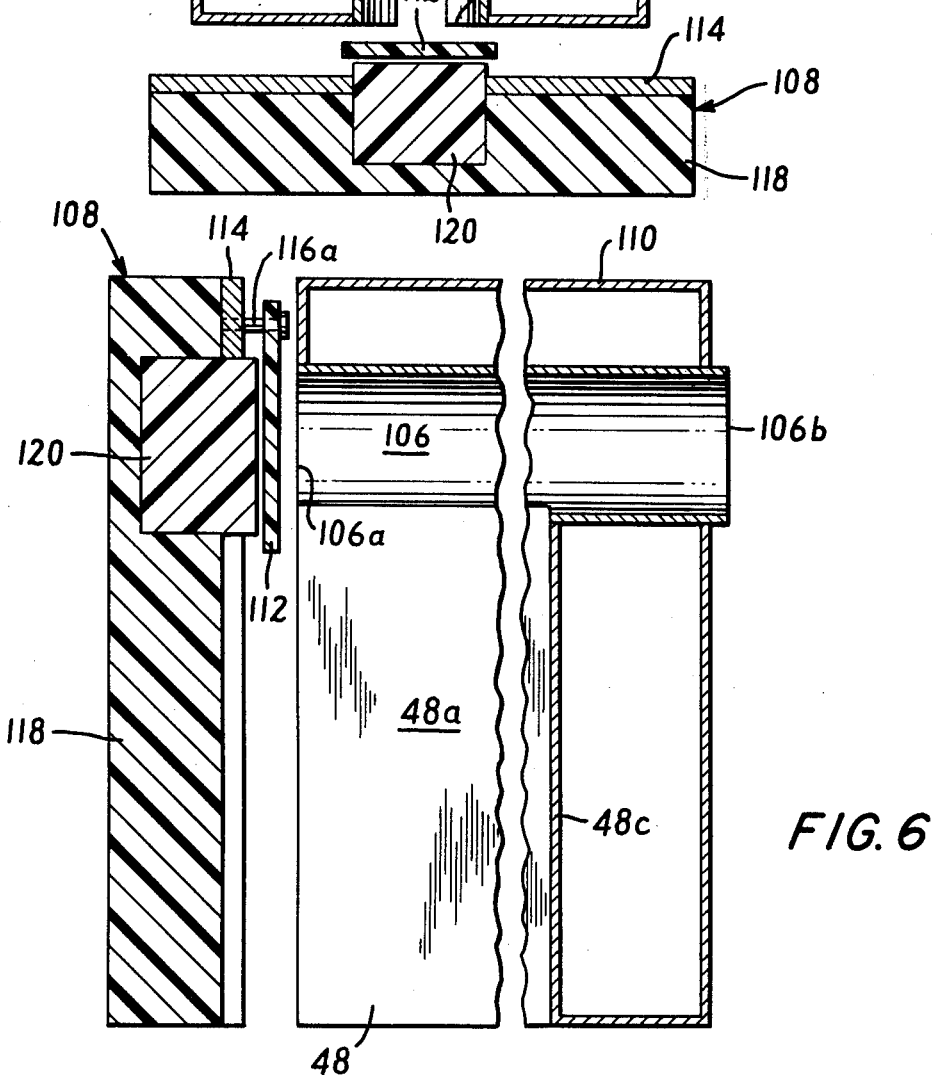
FIG. 6 is a side elevational sectional view as seen from plane VI—VI of FIG. 4.

As rods are received in transfer unit 34, means thereof are operative, as described in the aforesaid publication to accelerate the rods singly through a guide atop vertical channel 48. Referring to FIGS. 4–6, such guide 106 is shown as a tube having an open end 106a in facing relation with rod stop assembly 108 and a second opposite open end 106b for receiving rods transported through conduit 14. A lower portion of the tube sidewall extending inwardly from end 106a is cut away to an extent slightly longer than the rod length to expose channel 48. The channel sidewalls 48a and 48b and the channel rear wall 48c extend downwardly from guide 106 to define an outlet atop conveyor 50. Guide 106 and such channel walls are suitably supported by casing 110.

The rod stop assembly of the APHIS II system provides for disposing a metal plate in facing relation with guide end 106a, such plate being rigidly supported by a transparent plastic backing member and the metal plate being cut away to permit channel 48 to be viewed through the backing member. With substantial rod acceleration through the rod guide being attendant on the need to properly space issuance of successive rods into the guide, rod end damage is observed following impact of rods susceptible to damage with this type of rod stop assembly. Applicant has conceived a transport system including provision of rod decelerating means compensatory of the requisite acceleration and has developed several types of decelerating means embodying energy absorbers. Specific embodiments preceding his present FIGS. 4–6 embodiment include use of a body of synthetic foam, a surface of which is a direct rod impact surface, or use of metal spring overlays for the foam body.

The embodiment of energy absorbing means in FIGS. 4–6, comprising rod stop assembly 108, includes a flexible plastic sheet member 112, a surface of which is disposed in facing relation to guide end 106a to constitute a rod impact surface. Member 112 is removably secured at one end thereof to metal plate 114, as by threaded fasteners 116a and 116b. A rigid synthetic support 118 supports metal plate 114 and a volume of both support 118 and plate 114 are removed over an area facing member 112 to define a cavity opposite guide end 106a as shown in FIG. 6 and desirably of greater cross-sectional expanse than the cross-sectional expanse of guide 106. A block 120 of resilient material is seated in such cavity and spills forwardly of the cavity as shown in FIGS. 5 and 6. The rod impact surface of member 112 is desirably of greater area than the facing area of block 120 as shown in FIG. 4. Visual access to channel 48 is provided through support 118 by the further removal of plate 114 over a vertically directed expanse as shown in FIG. 4, support 118 being comprised of transparent material.

Sheet member 112 is advantageously arranged as a flap as shown and may be readily replaced by reason of its removable securement to plate 114. Sheet member 112 is desirably a polyester resin sheet, preferably a sheet of polyethylene terephthalate having a thickness of 0.01 inch and providing especially suitable energy absorption and wear resistance. Such preferred sheet may be "Mylar," a trade name of E. I. Du Pont de Nemours, Inc. Resilient block 120 is desirably a low density elastomeric foam, preferably a polyurethane foam having a thickness of 0.25 inch and providing especially suitable energy absorption, and is secured in the cavity in support 118 and plate 114 by an adhesive. Such preferred foam may be "Coustifoam," a trade name of Consolidated Kinetics Corp.

Various changes and modifications now made evident to those skilled in the art may readily be introduced in the foregoing embodiment of the invention without departing from the scope thereof. Thus, the apparatus and systems specifically illustrated in the drawings are intended in a descriptive and not in a limiting sense. The true spirit and scope of the invention is defined in the following claims.

What is claimed is:

1. A system for transporting cigarette rods from a first rod supply location to a second cigarette maker location, comprising:
   a. conduit means extending from said first location to said second location;
   b. rod supply means at said first location for supplying said rods in spaced succession to said conduit means and inclusive of a pneumatic source pressurizing said conduit means for transport of said rods therethrough; and
   c. rod receiver means at said second location including a guide having one open end and having an opposite open end, the latter receiving rods from said conduit means, channel means having an inlet for receiving said rods from said guide, said guide including an opening therein coextensive with said channel means inlet and energy-absorber means juxtaposed with said one end of said guide for dissipating the kinetic energy of rods traversing said guide by impact therewith, said energy-absorber means including a flexible plastic sheet member, a block of resilient material and support means for supporting said sheet member in separable relation to said support means, in flap relation to said block and in facing relation to said one end of said guide and outwardly thereof and for supporting said resilient block outwardly of said sheet member, said support means comprising a support member defining a cavity therein disposed opposite said one end of said guide, said block of resilient material being seated in said cavity and extending outwardly of said support member, said support member supporting said sheet member with one surface thereof in facing relation with said one end of said guide and a surface thereof opposite said sheet member one surface in facing relation with said block of resilient material.

2. The system claimed in claim 1 wherein said channel means includes an outlet for issuing said rods therefrom, said system further including a hopper for containing said rods and conveyor means for receiving said rods from said channel means outlet and conveying the same to said hopper.

3. The system claimed in claim 1 wherein said support member comprises a vertically upstanding rigid plastic element and a metal plate on one surface of said rigid element, said sheet member being removably secured to said metal plate.

4. The system claimed in claim 3 wherein said sheet member comprises a flap having an end thereof removably secured to said metal plate.

5. The system claimed in claim 3 wherein said rigid element is comprised of transparent material and wherein said metal plate defines an opening therethrough whereby said channel means is viewable through said rigid element.

6. The system claimed in claim 1 wherein said sheet member is polyester resin.

7. The system claimed in claim 6 wherein said block of resilient material is elastomeric foam.

8. The system claimed in claim 7 wherein said sheet member is polyethylene terephthalate.

9. The system claimed in claim 8 wherein said block of resilient material is polyurethane foam.

10. An energy absorber for dissipating kinetic energy of articles transported into impacting relation therewith comprising: a support defining a cavity therein, a block of resilient material seated in said cavity and extending outwardly of said support, a flexible plastic sheet member and means securing said sheet member to said support in overlying relation to said block of resilient material.

11. The energy absorber claimed in claim 10 wherein said sheet member comprises a flap having one end thereof removably secured to said support.

12. The energy absorber claimed in claim 10 wherein said sheet member is polyester resin.

13. The energy absorber claimed in claim 12 wherein said block of resilient material is elastomeric foam.

14. The energy absorber claimed in claim 13 wherein said sheet member is polyethylene terephthalate.

15. The energy absorber claimed in claim 14 wherein said block of resilient material is polyurethane foam.

16. The energy absorber claimed in claim 10 wherein said support comprises a vertically upstanding rigid plastic element and a metal plate on one surface of said plastic element, said sheet member being removably secured to said metal plate.

* * * * *